UNITED STATES PATENT OFFICE.

WILLIAM P. KOOKOGEY, OF BROOKLYN, ASSIGNOR TO THE KOOKOGEY ELECTRIC COMPANY, OF NEW YORK, N. Y.

METHOD OF PRODUCING BATTERY SOLUTIONS.

SPECIFICATION forming part of Letters Patent No. 408,629, dated August 6, 1889.

Application filed June 7, 1887. Serial No. 240,534. (No model.)

*To all whom it may concern:*

Be it known that I, WILLIAM P. KOOKOGEY, of Brooklyn, in the county of Kings and State of New York, have invented certain new and useful Improvements in Methods of Producing Battery Solutions, of which the following is a specification.

The present invention relates to galvanic-battery solutions, the object being to secure a solution of chromium, sulphuric acid, and water as a depolarizing battery excitant.

In a previous patent, No. 360,024, of March 29, 1887, I have claimed a battery solution made from bichromate of potassium, sulphuric acid, and water, so combined and in such proportions that the potassium base is precipitated, in the process of making the solution, in the form of sulphate of potash.

The object of the present invention is to secure a solution made from bichromate of soda in a similar manner. The advantage of using bichromate of soda lies chiefly in the fact that the sulphate of the base (sulphate of soda) is more soluble than sulphate of potassium and has no inclination to form chrome-alum. Therefore no great harm results if a small proportion of the base be left in solution, (except to slightly increase the internal resistance of the battery in which it is used,) which is not the case where bichromate of potash is used, as a very small proportion of the base held in solution is sufficient to form chrome-alum to an extent very detrimental to the working of the battery and the preservation of the elements. For these reasons less care is necessary in making the solution from bichromate of soda than in the case of bichromate of potassium, and the temperature need not be so high.

To make the solution under the present invention, I add to two and a half pounds of water (preferably hot water) three-fourths of a pound of bichromate of soda of fair commercial quality, and to the mixture add, stirring, three and one-half pounds of sulphuric acid, (avoidupois,) about the weight 66° Baumé, allow the solution to stand at a temperature varying from 60° to 75° Fahrenheit for about twenty-four hours until the sulphate of soda is precipitated to the bottom of the vessel, and then siphon off, when it will be ready for use.

The proportions above stated may be slightly varied, though I recommend a reasonably strict observance of the formula given, as experience has taught me that it gives the best results.

Where the solution is to be used for single-liquid batteries, however, the proportion of acid and bichromate of soda may be reduced about one-half, though for such purposes I recommend making the solution under the formula first given and diluting it after made and siphoned off.

While at first sight it would seem a chemical impossibility to precipitate the base of bichromate of soda in the form of a sulphate—the sulphate of soda being almost as soluble as the chromium oxide—still there is no doubt that it may be done under the formula set forth, as has been frequently proved and demonstrated by innumerable experiments and practical workings.

Having thus described my invention, what I claim is—

The herein-described method of producing chromic battery solution, which consists in adding to water (preferably heated) bichromate of soda, and adding to this mixture sulphuric acid, allowing the mixture to stand until the sulphate of soda is precipitated, and then siphoning off the liquid, the ingredients being combined in substantially the proportions stated.

In witness whereof I hereunto set my hand in the presence of two witnesses.

WM. P. KOOKOGEY.

Witnesses:
WILLIAM W. DODGE,
T. W. SORAN.